United States Patent [19]
Clevanger, Jr. et al.

[11] 3,880,251
[45] Apr. 29, 1975

[54] STEERING LOCK FOR A VEHICLE

[75] Inventors: James T. Clevanger, Jr., Lancaster; Gary C. Snyder, New Holland, both of Pa.

[73] Assignee: Sperry Rand Corporation, New Holland, Pa.

[22] Filed: July 2, 1973

[21] Appl. No.: 375,584

[52] U.S. Cl. ............. 180/77 H; 74/473 R; 180/6.48
[51] Int. Cl. ............................................. B60k 29/00
[58] Field of Search ........ 180/6.48, 77 H; 74/473 R, 74/531, 471 XY

[56] References Cited
UNITED STATES PATENTS

| | | | |
|---|---|---|---|
| 2,919,601 | 1/1960 | Cain | 74/531 |
| 3,055,445 | 9/1962 | Mendez et al. | 180/6.48 |
| 3,572,033 | 3/1971 | Tolley | 180/77 H |
| 3,625,302 | 12/1971 | Lauck | 180/77 H |

*Primary Examiner*—Allen N. Knowles
*Attorney, Agent, or Firm*—Frank A. Seemar; John R. Flanagan; Joseph A. Brown

[57] ABSTRACT

A steering lock associated with the control device of a vehicle for maintaining the vehicle in a particular direction. The steering lock is interconnected to the control device in such a way that when disengaged, it will linearly move in direct relationship to any movement imparted to the control device which effects the direction of travel of the vehicle. The steering lock includes an interconnecting means to couple the control device to a fastening means which when engaged will secure the control device in a selected position associated with a particular direction of travel. The steering lock only controls the mode of operation associated with the direction of travel of the vehicle, thus when the fastening means is engaged the operator can still control the rate of speed of the vehicle.

5 Claims, 4 Drawing Figures

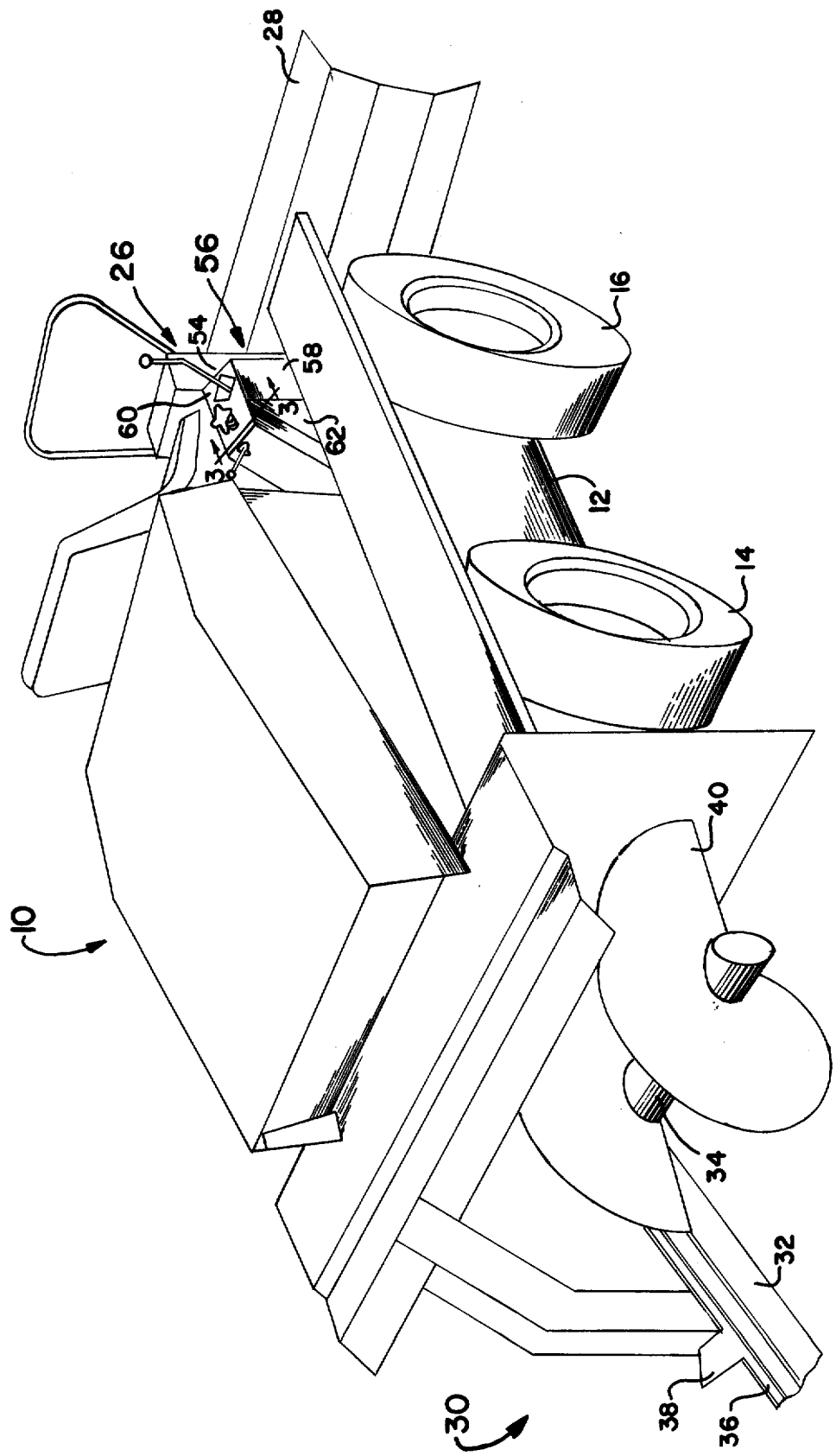

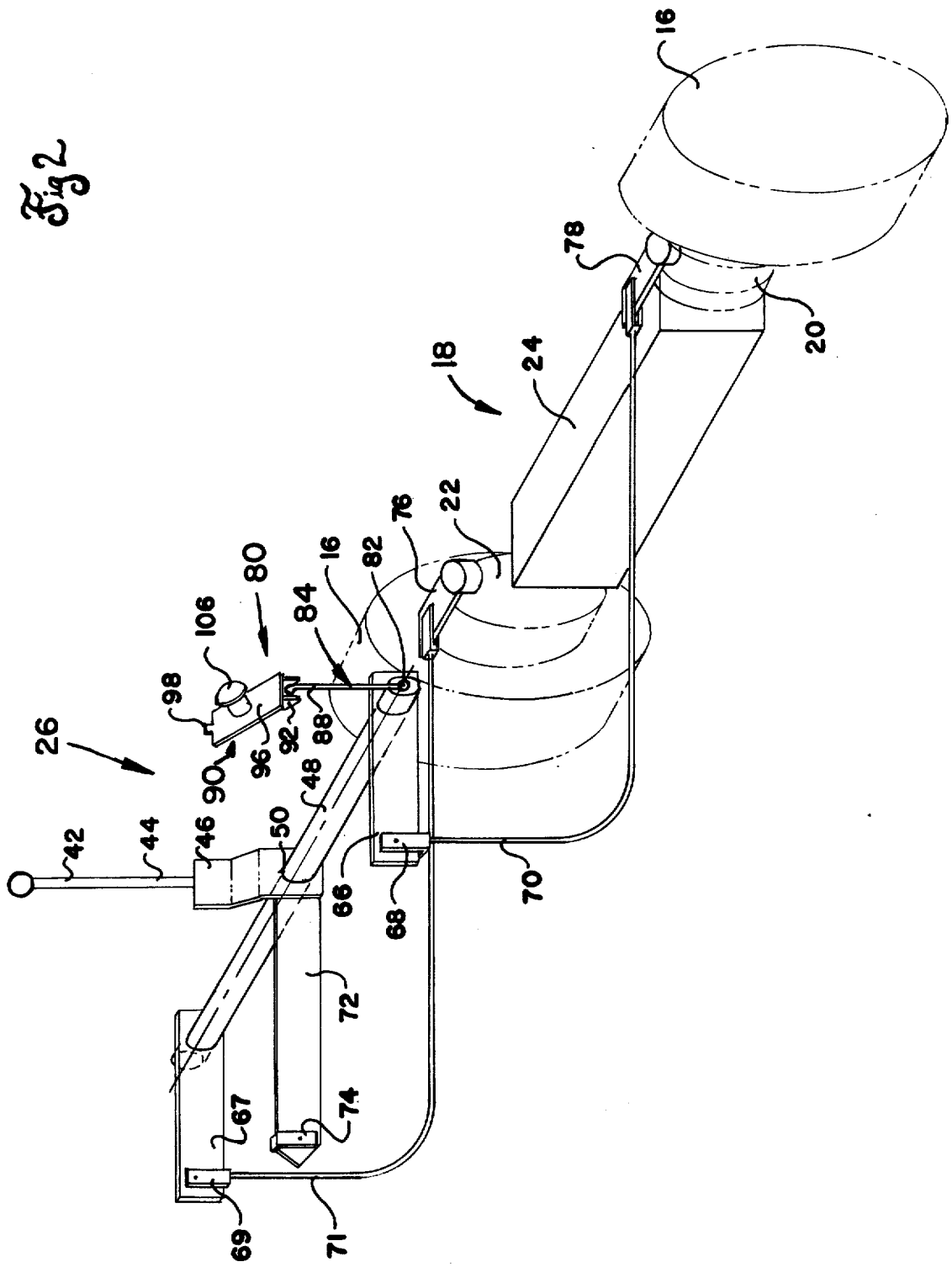

STEERING LOCK FOR A VEHICLE

BACKGROUND OF THE INVENTION

This invention relates generally to a device for controlling the direction of travel of a vehicle, and more particularly, to a steering lock associated with a control means to more precisely set and control the desired direction of the vehicle.

Vehicles of the type having earthworking implements associated therewith are generally required to operate over a wide range of speed power settings. To supply the power requirements necessary to operate these vehicles, sophisticated hydrostatic and hydraulic power sources have been developed. Throughout the years, many innovations have focused directly on the above types of power sources, and more particularly, to means for controlling the operation of such power sources. Recently, earthworking vehicles, as well as all wheeled vehicles which employ such power sources, have been provided with a single control arm, commonly referred to as a monostick, through which the operator can control not only the speed of the vehicle but its direction as well. These single control arms are generally connected through cables or other suitable connections to the activating means of the power source. These connections are such that when the control arm is moved in a particular direction, the connections to the activating means will respond accordingly and thereby activates simultaneously the respective motors connected to the driven wheels of the vehicle. These connections, from the control arm to the activating means of the power source, are geometrically arranged so that upon movement of the control arm in either a forward or rearward direction, the motors of the power source will be activated precisely the same amount to effect propulsion of the vehicle in a straight path. If the operator desires to turn the vehicle, he moves the control arm towards the direction in which he wishes the vehicle to travel and, in so doing, manipulates the connections to the activating means of the power source so that the motor controlling the power supply to wheel positioned on the outside of the turn will be activated to achieve a greater speed than the motor which controls rotation of the wheel positioned on the inside of the turn. Further, if the operator desires to make an exceptionally sharp turn, the operator will move the control arm further towards the direction in which he wishes the vehicle to be turned thereby increasing the speed of the outside wheel of the turn and differentially decreasing the speed of the wheel positioned on the inside of the turn thereby effectuating what is commonly referred to as a skid turn.

The propulsion controls presently being used with earthworking vehicles, provide several limitations and disadvantages with which the operator of the vehicle must contend. These limitations and disadvantages include an inability to maintain the control arm in a particular steering position; inability to automatically maintain the vehicle in a selected direction when a variation in the ground contour is encountered; inability to achieve a straight line or a particular desired direction of travel when the power source is delivering an unequal amount of power to the drive wheels; and also, to maintain the vehicle in a selected direction of travel while permitting a change in the rate of speed of the vehicle.

The first disadvantage, relating to the inability of present control devices to lock the control arm in a particularly steering mode to maintain a desired direction of travel of the vehicle, limits the operator's maneuverability during operation of the vehicle. For example, if during operation of the vehicle the operator wished to step down from the vehicle and examine the actual performance of the vehicle or if he wished to tend some other function during the operation of the vehicle, he could not do so and maintain the vehicle in a desired direction. This disadvantage presents numerous difficulties as well as severe limitations to an operator of an earthworking vehicle since it is extremely advantageous for him during the operation of the vehicle to examine the performance of the vehicle.

The second disadvantage relates to the vehicle's inability to remain in a particular direction, without having the operator continually manually adjust the control device during the operation of the vehicle. This creates a situation in which the vehicle may be traveling over variations in ground contour necessitating the setting and maintaining of the propulsion control arm of the vehicle at a position which would offset any motion to the vehicle caused by the contour of the ground. If the operator wishes to have the vehicle travel over varying ground contours for some distance or in a particular direction, i.e., a curved path, he could set the propulsion control to a position which would correspond to the direction in which he wishes the vehicle to travel and then lock said propulsion control in that particular steering position thereby freeing him for other tasks.

The third disadvantage mentioned above, inherent in controls, presently available, is their inability to compensate for any unequal power transmission which may be generated by the individual motors associated with their respective driven wheels. Hydrostatic and hydraulic transmissions as generally designed today, will, due to the intricacies of the individual components, vary in their power output supplied to the driven wheels. This inequality in power causes the vehicle to deviate from a desired direction thereby causing the operator to remain in constant contact with the propulsion control to prevent such deviation.

The fourth disadvantage relates to the inability of the operator of the vehicle to retain any measure of control over the vehicle after he has set the control device in a particular steering mode. This is to say that once the operator has set the direction of the vehicle he relinquishes his control over the speed of the vehicle. Since with control devices presently available, both the rate of speed of the vehicle and the steering operation of the vehicle are inseparately interconnected thus causing the situation in which the vehicle may be traveling over the ground in a particular direction set by the operator through the use of some sort of direction control; when for one reason or another, if he wishes to instantaneously either accelerate or decelerate the speed of the vehicle he must disengage the direction control and manually reset the speed of the vehicle to the new desired speed. If the operator could without having to disengage the steering lock change his rate of speed simply by moving the control arm to a new speed setting it would eliminate his having to manually disengage the steering lock and then re-engage and reposition said steering lock to the particular steering mode he was in prior to the time he felt it necessary to alter the speed of the vehicle.

OBJECTS AND BRIEF DESCRIPTION OF THE INVENTION

It is, therefore, the main object of this invention to provide a steering lock to be used in combination with a control device which will eliminate any of the inconveniences or disadvantages inherent in control devices presently in use.

Another object of this invention is to provide a steering lock operably connected to a control device which will, upon engagement, set and maintain the control device in a desired steering mode.

Another object of this invention is to provide a steering lock interconnected with a control device which will allow the operator to set the control device to offset any unequal power outputs which are inherent in frequently used hydrostatic or hydraulic transmissions.

Another object of this invention is to provide a steering lock operably interconnected to a control device which will allow the operator to lock the vehicle in a selected direction while permitting him to vary the speed of the vehicle without disengaging the steering lock.

The present invention contemplates a steering lock comprising an interconnecting means having one portion connected to the control device, and another end connected to a fastening means. The interconnecting means is adapted to move in conjunction with the movement of the control device in its second mode of operation, said second mode of operation being the one which affects the direction of the vehicle so that any movement of the control device relating to a change in the direction of the vehicle will result in a corresponding movement to locking means under conditions where the locking means is disengaged. Once the control device is in the desired steering mode the locking means can be secured thereby maintaining the control device in the selected steering mode.

The foregoing and other objects, features and advantages of this invention will be apparent to those skilled in the art after consideration of the following detailed description, taken in conjunction with the accompanying drawings, in which the preferred form of this invention is illustrated.

IN THE DRAWINGS

FIG. 1 is a perspective view of an earthworking vehicle taken from the right rear of the vehicle.

FIG. 2 is an isometric view of the control device and the interconnected steering lock.

DESCRIPTION OF THE PREFERRED EMBODIMENT

Figure 4:
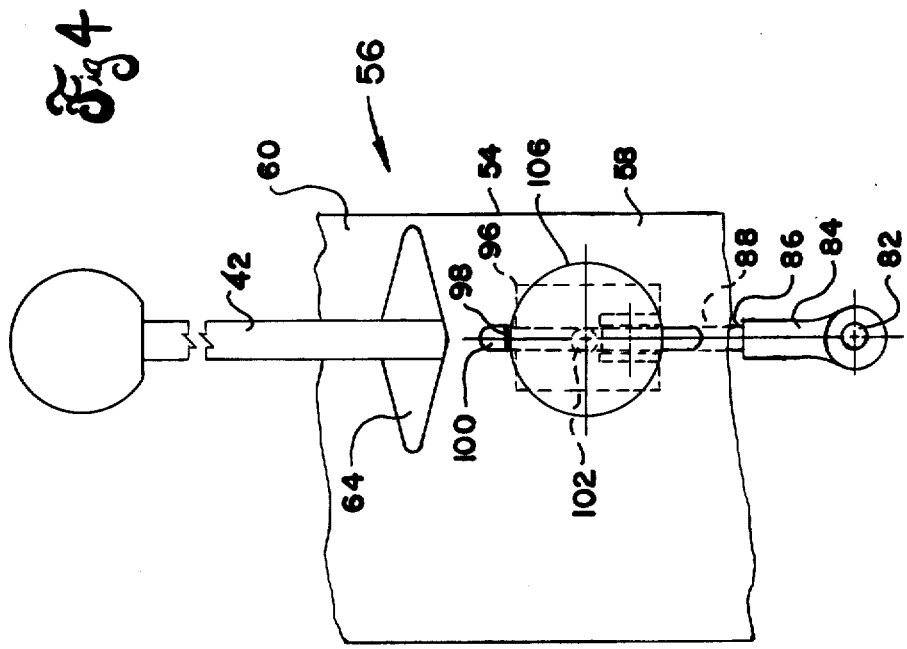
FIG. 4 is an end view taken along line 4—4 of FIG. 3.

In the following description, right-hand and left-hand reference is determined by standing to the rear of the earthworking vehicle and facing the direction of travel.

The control device according to the invention is embodied in an earthworking vehicle generally designated 10, mounted upon frame 12, which is supported for travel across the ground by right and left pairs of wheels 14 and 16 (only one wheel of each pair being shown). Included on frame 12 is a drive means 18 which powers hydrostatic transmissions 20 and 22 which are operably connected to the wheels 16 of the vehicle. Also associated with drive means 18 is pump 24 and control device 26 operably associated with the hydrostatic transmissions 20 and 22 of the drive means 18. Control device 26 is manually operable throughout first and second modes of operation to control the rate of speed of the vehicle in said first mode and direction of travel of the vehicle in the second mode.

As illustrated in FIG. 1, on the forward end of frame 12 is mounted plow 28 which forms no part of the present invention while at the rear of frame 12 is mounted a trenching apparatus, generally designated 30. Likewise, apparatus 30 forms no part of the present invention, and even though an earthworking vehicle employing a trenching apparatus 30 is shown as the work performing means mounted on the earthworking vehicle, as will become apparent hereafter, the invention is not intended to be so limited. For example, the work performing means could be any type of device which performs work as the vehicle moves along the ground.

In any event, the trenching apparatus 30 comprising a boom 32 which is mounted on rotatable shaft 34 which is operably connected to a power source, not shown, said shaft being pivotally mounted on frame 12. Endless chain 36 is provided with digging blades 38 which dig and propel material with which contact is made. Additionally, there are provided augers 40 which are mounted on the rotatable shaft 34. These augers clear excavated material away from the trench and deposit the material conveniently along the side of the trench so that after the trenching operation, the ditch can be refilled simply by pushing the material back in the trench. Endless chain 36 is powered by driven sprockets not shown, which are operably connected to rotatable shaft 34.

Turning to FIG. 2, the control device 26 is mounted on frame 12 and is movable through first and second interrelated modes of operation. Control arm 42 has a lower end 44 which is welded to the upper end of a fastening plate 46. The opposite or lower portion of fastening plate 46 is rigidly mounted to a control shaft 48 by control arm connection 50. Control shaft 48 is supported for movement by a ball and socket assembly 52 (see FIG. 3) which has one end rigidly mounted to the front wall 54, shown in FIGS. 1 and 4, of the control means housing 56. Such a connection permits both rotational and pivotal movement of the control shaft. Control means housing 56 is provided with a front wall 54, sidewall 58, top wall 60 and rear wall 62. The control means housing 56 has an opening 64 in its top wall 60, said opening having a rhombic configuration which allows movement of control arm 42 through its entire range of positions in both the first and second modes of operation. As shown in FIG. 2, the control member 42 is in its neutral position.

Rigidly mounted to control shaft 48, on either side of control arm connection 50 are arms 66 and 67 which extend perpendicularly from control shaft 48. Arms 66 and 67 are connected to control shaft 48 so that any movement imparted to said control shaft will cause a corresponding movement to arms 66 and 67. The ends of said arms are provided with pivotable connection 68 and 69 which secures one end of the connecting means 70 and 71 to the arms 66 and 67, thereby coordinating the movement of connecting means 70 and 71, control shaft 48 and the control arm 42. Also, rigidly connected to the control shaft 48 is link 72 which extends perpendicularly from the control shaft in the same plane as arms 66 and 67. Link 72 has, on its end opposite its rigid connection, mounting means 74 capable of receiving a vernier speed control, not shown, which could move, secure and maintain the entire control device in any position throughout its first mode of operation which corresponds to the rate of speed of the vehicle. As best seen in FIG. 2, all of the projections are rigidly mounted to the control shaft 48 in such a way that when control arm 42 is moved in either a forward or rearward direction, from the neutral position, control shaft 48 is rotated thereby simultaneously moving both rigidly mounted arms 66 and 67, and link 72 vertically through the same relative distance. This rotational movement, caused by either a forward or rearward movement of the control arm 42, constitutes the first mode of operation of contol device 26. Thus, when control arm 42 is moved in this mode of operation, control shaft 48 will be rotated thereby imparting an equal amount of movement to connection means 70 and 71 which have one end pivotally connected to arms 66 and 67 while their other end is operably interconnected to activating means 76 and 78 of the hydrostatic transmissions, 20 and 22, of the vehicle. These activating means control the flow of fluid from pump 24 into the respective hydrostatic transmissions of the vehicle. So when control arm 42 is moved either forwardly or rearwardly, arms 66 and 67 will be pivoted so as to move connecting means 70 and 71 either upwardly or downwardly through the same distance thereby effecting the activating means 76 and 78 causing a corresponding increase or decrease in the speed of the vehicle. Since both activating means 76 and 78 move the same amount, the driven wheels of the vehicle increase or decrease their speed simultaneously.

Associated with control shaft 48 of the control device 26 is a steering lock means 80. The lower portion of the lock means 80 includes a ball joint assembly 84 having the ball end 82 mounted to one end of the control shaft 48 while its other end 86 is capable of receiving eye bolt 88. Eye bolt 88 is interconnected to guide weld assembly 90 by clevis pin 92 and cotter pin 94. It should be noted that a ball joint assembly was specifically selected for use with the steering lock means so that the control shaft 48 can freely rotate when operating in its second mode, to effect the speed of the vehicle, without effecting the steering lock.

The guide weld assembly 90 of the steering lock means 80 include plate 96, a hole 102 through the plate 96, a nut 104 welded to plate 96 and aligned with hole 102, a knob 106 having a bolt 108 welded thereto and threaded through the hole 102 and welded nut 104, and a positioning nut 110 threaded to the lower portion of bolt 108. The guide weld assembly 90 operates in conjunction with a slot 100 positioned in sidewall 58 of the control device housing. Bolt 108 is positioned through slot 100 and hole 102 of plate 96 and is threaded through the welded nut 104 so that it extends beneath plate 96.

The lock means is operated by rotating knob 106 so that welded nut 104 is threaded towards the knob thereby compressing plate 96 against the inner wall of sidewall 58 of control housing 56. Once the knob is secured, the entire steering lock means 80 is prevented from movement thereby restricting control device 26 in its movement throughout its second mode of operation.

Figure 3:
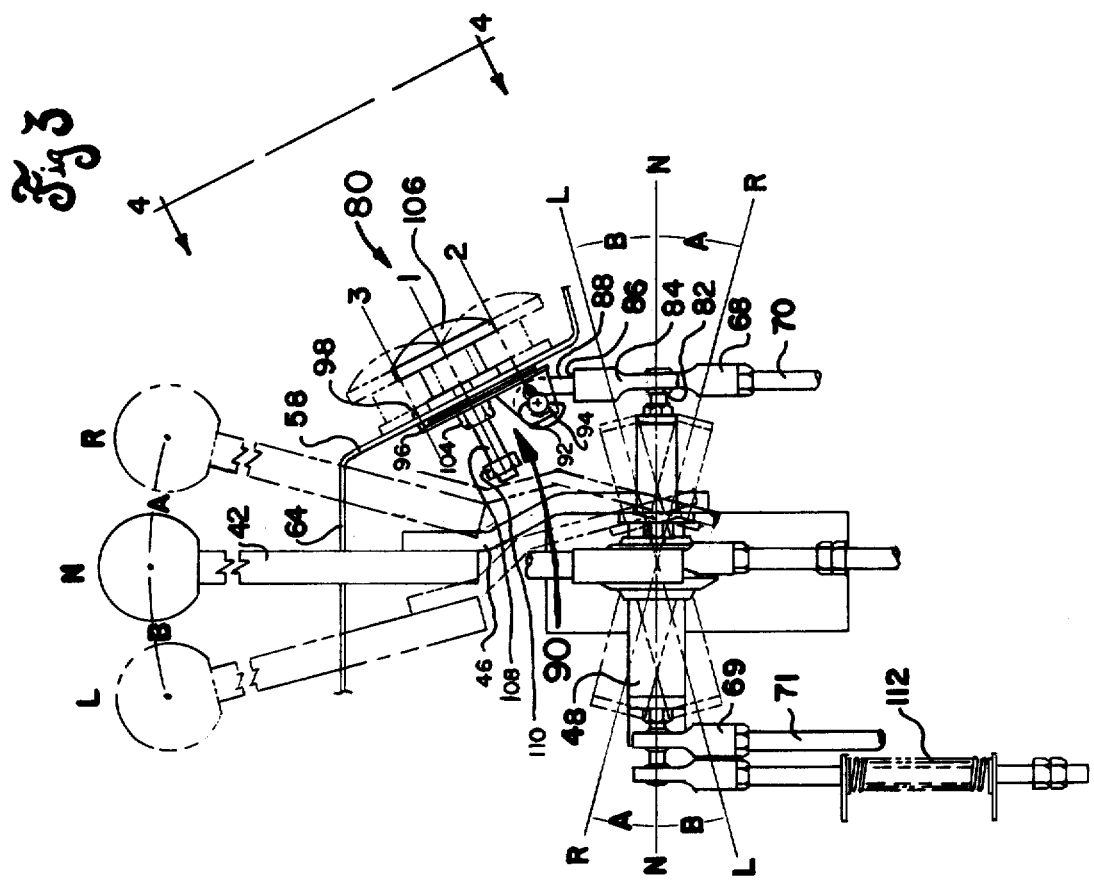
FIG. 3 is a sectional view taken along line 3—3 of FIG. 1 showing the control device and the interconnected steering lock in various operating positions.

As illustrated in FIG. 3, as control arm 42 is moved from the neutral position, indicated as position N, to position R, to the right of position N, through a distance A, control shaft 48 will be pivoted in the ball and socket assembly 52 in the same direction, i.e., clockwise, so that the right side of the control device will be a lower position R, then when in its neutral position. The movement of control arm 42 and the simultaneous pivoting of control shaft 48 creates a corresponding movement in the activating means 76 and 78 of the hydrostatic transmissions. Therefore, with the movement of control arm 42 as discussed above, we see that activating means 78 would be moved in a forward direction thereby decreasing the flow of fluid from pump 24 to hydrostatic transmission 20 causing a reducton in speed of the associated drive wheel. While activating means 78 is moved in a forward direction to decrease the speed of the associated driven wheel, activating means 76 is simultaneously moved rearwardly so as to increase the flow of fluid from pump 24 to hydrostatic motor 22 thereby increasing the speed of the associated driven wheel. This type of differential adjustment of the hdyrostatic motors is what is necessary to thereby effectuate a right hand turn. The movement of control arm 42 from position N to position R has caused steering lock means 80 to experience an associated movement from position 1 to position 2. Likewise, when control arm 42 is moved from position N to new position L through distance "B" control shaft 48 would be pivoted in a counterclockwise direction thereby moving activating means 76 forwardly causing a corresponding decrease in the flow of fluid from pump 24 to hydrostatic transmission 22 causing a decrease in the speed of the associated wheel, while activating means 78 is moved to the rear thereby increasing the flow of fluid from pump 24 to the hydrostatic transmission 20 thereby increasing the speed of the associated wheel causing the vehicle to turn to the left. The movement from position N to position L causes the steering lock 80 to move from position 1 to corresponding position 3. The differential movements of the activating means 76 and 78 caused by the pivoting of control shaft 48 is referred to as the second mode of operation of the control device 26. Movement of the first mode of operation, the rotational movement of said control shaft, and movement through the second mode of operation, the pivoting movement of said control shaft can be carried out independently of each other or in conjunction with each other. That is to say, that even though control shaft 48 has been locked in position R by the steering lock secured at position 2, the control shaft can still be rotated by moving control arm 42 either forwardly or rearwardly causing a simultaneous movement of activating means 76 and 78 through an equal distance from said locked second mode position. With this type of independent operation throughout the respective modes of operation the operator can retain a certain degree of control over the vehicle even though he has used the steering lock to set the direction of the vehicle.

As mentioned hereinabove the control device 26 is shown in a neutral position and is biased to return to this position through the use of neutralizing springs 112 which are connected to the left side of control shaft 48. These springs return the control shaft to an essentially horizontal position when disengaged.

Operation

Again, referring to FIG. 3, when the operator wishes to change the direction of the vehicle he moves control arm 42 either to the right or to the left, thereby pivoting the control shaft 48 in either a clockwise or counterclockwise direction around ball and socket assembly 52, the entire steering lock means 80 will be moved to a position which corresponds to the position of the control shaft 48 which represents the particular direction of travel of the vehicle. As illustrated in FIG. 3, when control arm 42 is moved from position N to position R a clockwise movement from position N to position R is realized by control shaft 48. Movement of the control shaft causes the steering lock means to move through a corresponding distance from position N to a new position R. Once the steering lock means has moved to this position, the operator can, by simply rotating knob 106 fasten steering lock means 80 thereby securing and preventing control shaft 48 from moving from the particular setting in the second mode of operation. Likewise, if control arm 42 is moved to the left steering lock means 80 will move to new position L at which time the operator can, if he so desires, lock the vehicle in this particular direction by preventing movement of the control shaft in its second mode of operation.

From the foregoing, it will be seen that the invention provides a steering lock means which is capable of setting and retaining the control device in any position throughout its second, or steering mode of operation. It is also noted that even after said lock means is engaged the operator can manually adjust the rate of speed of the vehicle without disengaging the steering lock means since movement of the control device is only restrained in its second mode of operation. This provides the operator with a means to obviate a great many of the disadvantages inherent in similar control devices, presently in use.

While the preferred structure in which the principles of the present invention have been incorporated are shown and described above, it is to be understood that the invention is not to be limited to such particular details, but that, in fact, widely different means may be employed in the practice of the broader aspects of the invention.

Having thus described the invention, what we claim is:

1. Improved vehicular control apparatus comprising in combination:
    A. a frame;
    B. ground engaging means mounted in operative relationship with said frame;
    C. drive means connected to said ground engaging means and adapted to provide power for propelling the frame over the ground at a varying rate of speed and in a selected direction;
    D. control means mounted on said frame and interconnected to said drive means to control said drive means, said control means comprising
        1. a control arm movable in first and second modes of operation over a predetermined range, said control arm reciprocally movable along a first path in a fore-and-aft direction for controlling the rate of speed of said vehicle in said first mode and said control arm simultaneously reciprocally movable along a second path generally perpendicular to said first path for controlling the direction of travel in said second mode,
        2. means for locking said control arm in an infinite number of selected positions along said second path, and
        3. interconnecting means to operably interconnect said control arm with said lock means, whereby said lock means is adapted to permit variation in said control arm's position along said first path under conditions where said control device is locked in a selected position along said second path.

2. Improved vehicular control apparatus, as set forth in claim 1, wherein said lock means includes means to secure said lock means in a selected position.

3. Improved vehicular control apparatus, as set forth in claim 2, wherein said interconnecting means comprise a member mounted to said control arm in a manner whereby movement of said member will only occur under conditions where said control arm is moved along said second path.

4. Improved vehicular control apparatus, as set forth in claim 3, wherein said control means further comprise a control shaft movably mounted on said frame, said control arm having one end rigidly mounted to said shaft, second and third arms extending perpendicularly from said shaft, said second and third arms having one end rigidly connected to said shaft so that movement by the control arm in any direction in a horizontal plane will impart a corresponding movement to the entire control means, and connecting means operably interconnecting said second and third arms to said drive means.

5. Improved vehicular control apparatus, as set forth in claim 4, wherein said control shaft is movable both fore-and-aft and laterally within a horizontal plane.

* * * * *